Patented July 8, 1941

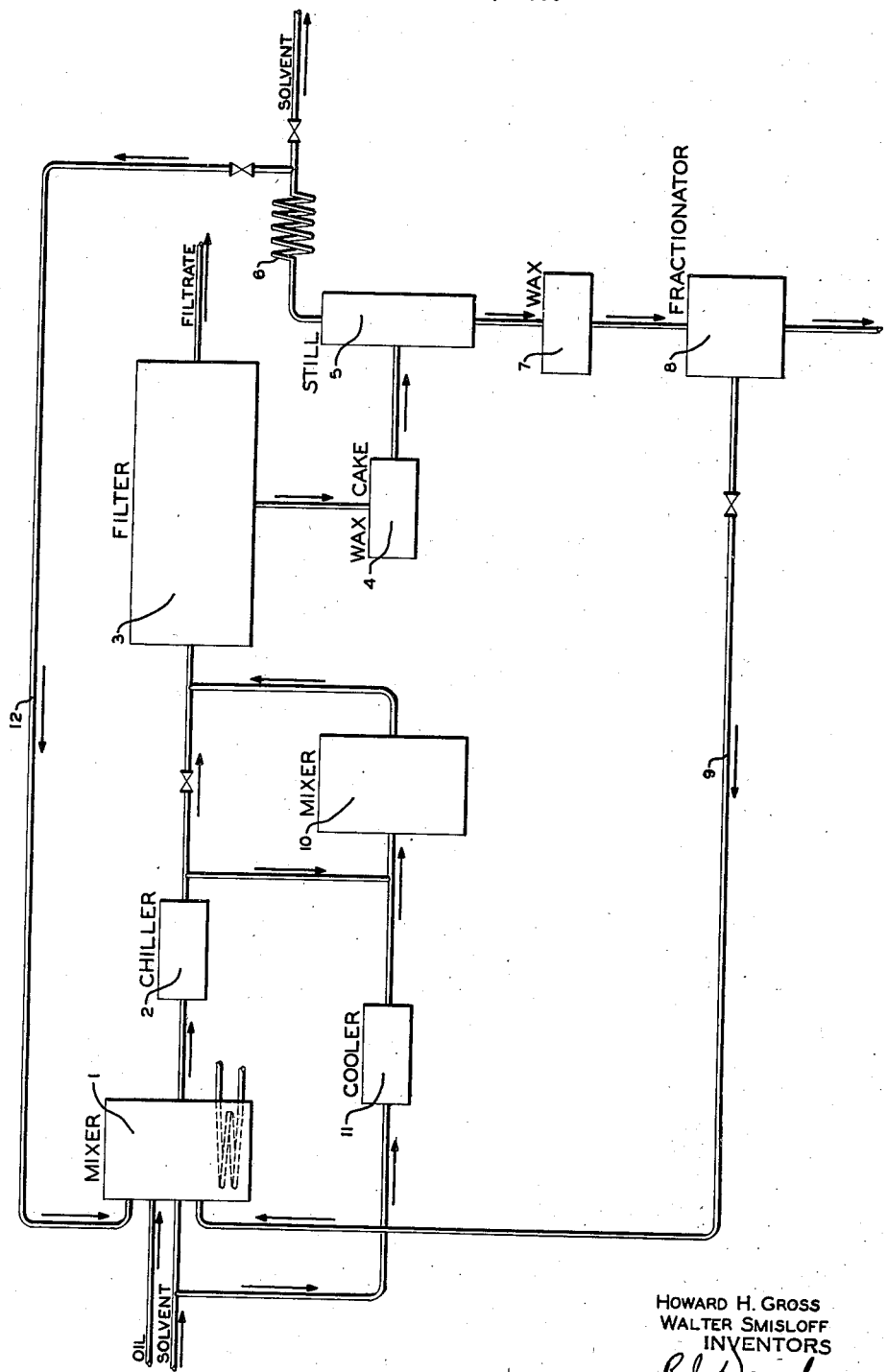

2,248,498

UNITED STATES PATENT OFFICE 2,248,498

DEWAXING HYDROCARBON OIL

Howard H. Gross and Walter Smisloff, Fishkill, N. Y., assignors to The Texas Company, New York, N. Y., a corporation of Delaware Application February 24, 1939, Serial No. 258,205

5 Claims. (Cl. 196—18)

This invention relates to dewaxing hydrocarbon oil, such as mineral lubricating oil. More particularly it relates to dewaxing mineral lubricating oil containing relatively small amounts of wax or from which the wax is precipitated in a relatively dense form.

The invention relates to dewaxing oil of the above type by continuous filtration, advantageously with a continuous rotary type of filter, wherein a portion of the wax removed in the filtration is recycled through the filter with fresh wax-bearing charge, thereby to increase the concentration of wax in the mixture being filtered, so that the filter production rate is improved very substantially.

Such a method of dewaxing has been disclosed in pending application Serial No. 255,834, filed February 11, 1939, by William P. Gee, for Dewaxing hydrocarbon oil.

The present invention contemplates a modification of the foregoing procedure and involves recycling a selected fraction of wax, as, for example, a fraction which contains comparatively little naturally-occurring wax crystal modifying material.

Advantageously, the particular fraction of wax recycled comprises the lower melting point portion of the wax, such as the fraction comprising wax constituents having a melting point below about 140° F. The wax as produced may be fractionated either by distillation or by means of solvents to form a low melting point fraction and a high melting point fraction.

Viscous wax-bearing lubricating oil stocks, and particularly residual stocks, usually contain substantial amounts of certain constituents which exert a modifying action upon the crystal structure of the wax when precipitated from a solution of the wax-bearing oil in a dewaxing solution. These naturally-occurring constituents appear to be concentrated mainly in the high melting point wax fraction. It has been observed that the presence of too much modifying material is detrimental to filter rates and yields in dewaxing. Recycling of the wax as produced in filtration tends to increase the concentration of this naturally-occurring modifying material in the mixture being dewaxed. The present invention contemplates avoiding this increase in concentration by recycling that portion of the wax produced which is comparatively free from the naturally-occurring modifying material.

In this way the solids content of the charge stock being filtered is built up so that a cake of sufficient thickness to be discharged can be formed with a more rapid cycle rate. At the same time the amount of the naturally-occurring modifier is diluted to an extent such as to bring it more closely within the optimum range of the modifier content where higher filtration rates and better yields are obtained.

As described in the above-mentioned application, Serial No. 255,834, the method of dewaxing involving recycling of a portion of the wax is especially useful in the dewaxing of stocks, particularly of the residual type, which tend to form relatively dense and compact filter cakes.

Heretofore difficulty has frequently been experienced in dewaxing such stocks by continuous rotary filters, due to the excessive length of time required to deposit a wax cake of sufficient thickness to be discharged from the filter cloth. It is desirable to have a wax cake of not less than about 1/4" in thickness in order to be discharged properly from the filter surface. A thinner cake may result in a smearing action by the wax cake scraper which tends to plug the filter cloth and to decrease the flow of fluids therethrough.

With wax-bearing oil stocks, which tend to form relatively dense and compact wax cakes, and stocks which contain small amounts of wax, the cycle time for continuous filters necessary to deposit a wax cake of desired thickness may be so great as to reduce seriously the production rate of the filter and cause the operation to become unattractive commercially. For example, it may require as much as 700 seconds or more of filtering time to form a wax cake of about 1/4" thickness, as contrasted with about 15 to 60 seconds of filtering time normally required to produce the same thickness of wax cake.

The production rate in the case of stocks of the above character can be increased very greatly by artificially increasing the concentration of wax in the mixture being dewaxed. With increased wax concentration the time required for forming a filter cake of desired thickness is reduced. The resulting cake can be washed more effectively and can be discharged more effectively, due to its increased thickness and weight. At the same time the filter production rate is increased very substantially while obtaining a uniformly high yield of dewaxed oil.

It has been known in the prior art to incorporate waxy material in wax-bearing mixtures to be dewaxed. For example, U. S. Patent No. 1,881,643, granted to Leo D. Jones on October 11, 1932, describes the addition of petrolatum or amorphous wax to wax-bearing oil prior to centrifuging, while U. S. Patent No. 2,053,872, granted to Samuel A. Montgomery on September 8, 1936, describes the addition of a small amount of heavy distillate or wax cake from such heavy distillate to light distillate lubricating oil stock prior to dewaxing with conventional filter presses.

These patentees, however, employ the added material for the purpose of conditioning the wax or modifying its construction so that it will precipitate in a different form.

The present invention differs from the practices described in the foregoing patents. In the first place, the present invention relates to the addition of wax to the wax-bearing oil charge in a continuous filtration operation involving stages of wax cake formation, washing, drying, and wax cake discharge. The addition of wax to the charge enables the control of wax cake thickness so as to permit effective washing, drying and cake removal, thereby securing the maximum filtration capacity with no sacrifice in yield of low pour test oil.

In the second place, the present invention involves segregating from the wax produced in the filtration a fraction which is comparatively free from wax crystal modifying constituents, and incorporating in the wax-bearing charge that particular fraction rather than a waxy material rich in wax crystal modifying constituents.

The effect of the presence of too much naturally-occurring modifier is indicated by comparing the results obtained with two residual lubricating oil stocks obtained from the same crude source, but each containing a different amount of the naturally-occurring wax crystal modifying material. Stock A is a residual fraction which has been deasphalted with propane and solvent-refined with furfural. Stock B, on the other hand, is a residual fraction which has been treated with acid and filtered in the presence of a contact clay.

The acid and contact clay treatments removed the bulk of the naturally-occurring wax crystal modifying material.

These two stocks were dewaxed under substantially similar conditions involving dilution with a selective solvent, chilling and filtering to remove the precipitated wax.

|  | Yield of dewaxed oil, percent by volume | Filter rate, gallons of dewaxed oil per square foot of filtering surface per hour |
|---|---|---|
| Stock A | 73.7 | 2.6 |
| Stock B | 82.5 | 15.9 |

Thus, it will be observed that in the case of stock B, containing the reduced amount of naturally-occurring modifying material, a materially higher filter rate was realized and at the same time there was a substantial improvement in the yield of dewaxed oil obtained.

By way of illustration, reference may be made to the accompanying drawing, which comprises a flow diagram for dewaxing in accordance with the method of the present invention.

Oil, such as a residual cylinder stock of 150 Saybolt Universal seconds, viscosity at 210° F. and containing around 8% wax, is mixed with a solvent such as a mixture containing 40% methyl ethyl ketone and 60% commercial benzol in a mixer 1. Around 4 to 15% by volume of wax of the character described above is added and the resulting mixture heated to about 160° F.

The mixture of oil, wax and solvent is then passed through a chiller 2 wherein it is chilled to a temperature of around 0° F. and below to precipitate the wax. The chilled mixture containing precipitated wax is then passed to a rotary type filter 3, wherein the solid hydrocarbons are removed from the mixture in the form of a filter cake of wax. The filtrate obtained comprises dewaxed oil and is withdrawn, the solvent being removed therefrom and returned for further use.

The wax cake produced in the filter 3 is accumulated in a tank 4 and from there passed to a still 5. In the still 5 the solvent retained in the wax cake is removed in vapor form, being drawn off through a cooling or condensing coil 6.

The wax accumulating in the still 5 is drawn off to a tank 7 and from there passed to a fractionator 8 wherein it is separated into a fraction containing comparatively little naturally-occurring wax crystal modifying material, and one or more other fractions in which the wax crystal modifying materials are mainly concentrated. The fraction substantially free from the modifying constituents is passed through a pipe 9 to the mixer 1 wherein it is incorporated in the wax-bearing oil being charged.

Complete solution of the recycled wax in the charge mixture can be accomplished by heating the mixture in the mixer 1 to a temperature sufficiently elevated and which can be accomplished by means of a suitable heating coil located within the mixer.

It is contemplated that the wax-bearing charge may be initially mixed in the mixer 1 with only a portion of the dewaxing solvent and this mixture containing the added wax chilled to about the dewaxing temperature in the chiller 2. From the chiller 2 it is then conducted to a mixer 10 wherein it is mixed with the remainder of the solvent, pre-chilled in a cooler 11, and from the mixer 10 the resulting mixture is then passed to the filter 3. With this type of operation the charge oil and the solvent may be mixed in the mixer 1 in the proportion of around one to two parts by volume of solvent to one part by volume of wax-bearing oil. The additional solvent added in the mixer 10 is sufficient to bring up the solvent content of the mixture to about three or four parts of solvent to one part of the original wax-bearing oil being charged to the mixer 1.

An alternative procedure involves removing in the still 5 both the solvent and a low-boiling fraction of the wax. The solvent and wax thus distilled from the wax cake are withdrawn through the cooler 6 and conducted through a pipe 12 directly to the mixer 1. This solvent and wax, while in a hot condition, may thus be added to the feed oil thereby facilitating solution in the charge oil, the solvent providing a component part of the solvent liquid initially mixed with the feed oil.

Fractionation of the wax in the fractionator 8 may be accomplished by means of solvents such as used in dewaxing, or by sweating.

It is contemplated that only the wax crystal modifying constituents may be removed from the wax and this can be accomplished by treatment with a solvent such as propane or by subjecting the wax to acid treatment.

It is also contemplated that the wax recycled to the filtering step may be obtained from an extraneous source, such as from a distillate lubricating oil fraction or a fraction of lower boiling range than that being dewaxed. For example, when dewaxing a residuum of the type described above a small proportion of a distillate fraction rich in wax constituents and comparatively free from wax crystal modifying constituents may be added prior to dewaxing the residuum.

The invention may be applied when dewaxing by pressure filtration such as with a Vallez type of filter.

In referring to the dewaxing solvent reference has been made to a mixture of methyl ethyl ketone and benzol. It is contemplated, however, that mixtures of other aliphatic ketones and aromatic hydrocarbons may be employed, as well as other selective solvents composed of a mixture of a wax anti-solvent and an oil solvent liquid. Such solvents as low-boiling petroleum hydrocarbons, including naphtha, gasoline, pentane, butane, propane, etc., or mixtures thereof may be used.

Obviously, many modifications and variations of the invention, as hereinbefore set forth, may be made without departing from the spirit and scope thereof, and therefore only such limitations should be imposed as are indicated in the appended claims.

We claim:

1. In the art of dewaxing oils by continuous filtration involving the forming, washing, drying and discharging of a wax cake in a recurring cycle, the steps comprising mixing a dewaxing solvent with a wax-bearing oil, which mixture upon chilling and filtering tends to deposit a thin cake difficult to discharge mechanically from the filter, chilling the mixture to precipitate wax, passing the chilled mixture to the filter to remove the precipitated wax and to produce a dewaxed filtrate, segregating from the removed precipitated wax a fraction containing comparatively little wax-crystal modifying material, and incorporating in the mixture prior to filtering a predetermined portion of said fraction of wax in such amount as to materially increase the ratio of wax to oil over that of the original wax-bearing oil charge to control the character and thickness of the cake whereby the same may be rapidly formed and removed from the filter while permitting a high filter production rate.

2. In the art of dewaxing oils in which wax is removed by means of a continuous rotary filter, the steps comprising mixing a dewaxing solvent with a wax-bearing oil, which mixture upon chilling and filtering tends to deposit a thin cake difficult to discharge from the filter, chilling the mixture to precipitate wax, passing the chilled mixture to the filter to remove the precipitated wax and to produce a dewaxed filtrate, treating the removed precipitated wax to separate therefrom constituents having wax crystal modifying properties, and mixing a predetermined portion of the treated wax comparatively free from naturally-occurring wax crystal modifying constituents with the mixture prior to filtering and in such amount as to materially increase the ratio of wax to oil over that of the original wax-bearing oil charge thereby to control the character and thickness of the cake whereby the same may be rapidly formed and removed from the filter while permitting a high filter production rate.

3. In the art of dewaxing oils by filtration in a continuous rotary filter, the steps comprising mixing a dewaxing solvent with a wax-bearing oil, which mixture upon chilling and filtering tends to deposit a thin cake difficult to discharge mechanically from the filter, chilling the mixture to precipitate wax, passing the chilled mixture to the filter to remove the precipitated wax in the form of a wax cake and to produce a dewaxed filtrate, removing said wax cake from the filter, separating the removed wax into a low melting point wax fraction comparatively free from naturally occurring wax crystal modifying constituents, and a high melting point wax fraction, incorporating in the initial mixture, prior to filtering, a predetermined portion of said lower-melting point wax fraction in such amount as to materially increase the ratio of wax to oil over that of the original wax-bearing oil charge thereby to control the character and thickness of the cake whereby the same may be rapidly formed and removed from the filter while permitting a high filter production rate.

4. In the art of dewaxing oils by continuous filtration involving the forming, washing, drying and discharging of a wax cake in a recurring cycle, the steps comprising mixing a dewaxing solvent with a wax-bearing oil, which mixture upon chilling and filtering tends to deposit a thin cake difficult to discharge from the filter, chilling the mixture to precipitate wax, passing the chilled mixture to the filter to remove the precipitated wax and to produce a dewaxed filtrate, distilling from the removed precipitated wax retained solvent and a fraction comprising low-boiling wax constituents comparatively free from wax crystal modifying constituents, and incorporating in the mixture, prior to filtering, said distilled solvent and wax, the wax being in such amount as to materially increase the ratio of wax to oil over that of the original wax-bearing oil charge to control the character and thickness of the cake whereby the same may be rapidly formed and removed from the filter while permitting a high filter production rate.

5. In the art of dewaxing oils by continuous filtration involving the forming, washing, drying and discharging of a wax cake in a recurring cycle, the steps comprising mixing the wax-bearing oil with a dewaxing solvent, which mixture upon chilling and filtering tends to deposit a thin cake difficult to discharge from the filter, chilling the mixture to substantially the dewaxing temperature to precipitate wax, adding additional chilled solvent, passing the resulting mixture to the filter to remove the precipitated wax and to produce a dewaxed filtrate, distilling retained solvent from the removed precipitated wax, segregating from said wax a fraction comparatively free from wax crystal modifying constituents, and incorporating said distilled solvent and said fraction of wax in the original wax-bearing oil prior to chilling, the solvent so incorporated forming a component part of the portion of solvent initially mixed with the feed oil, the wax being in such amount as to materially increase the ratio of wax to oil over that of the original wax-bearing oil charge to control the character and thickness of the cake, whereby the same may be rapidly formed and removed from the filter while permitting a high filter production rate.

HOWARD H. GROSS.
WALTER SMISLOFF.